(12) United States Patent
Ishikawa et al.

(10) Patent No.: US 6,980,388 B2
(45) Date of Patent: Dec. 27, 2005

(54) MAGNETIC HEAD SUPPORTING AND POSITIONING CONTROL MECHANISM

(75) Inventors: Hiroshi Ishikawa, Kawasaki (JP); Arata Ejiri, Kawasaki (JP); Hiroshi Tanaka, Suzaka (JP); Tsuguto Maruyama, Kawasaki (JP); Tsutomu Miyashita, Kawasaki (JP); Yoshio Satoh, Kawasaki (JP)

(73) Assignees: Fujitsu Media Devices Limited, Yokohama (JP); Fujitsu Limited, Kawasaki (JP)

( * ) Notice: Subject to any disclaimer, the term of this patent is extended or adjusted under 35 U.S.C. 154(b) by 67 days.

(21) Appl. No.: 10/295,911

(22) Filed: Nov. 18, 2002

(65) Prior Publication Data

US 2003/0099058 A1 May 29, 2003

(30) Foreign Application Priority Data

Nov. 28, 2001 (JP) .............................. 2001-363400

(51) Int. Cl.⁷ ........................................... G11B 21/02
(52) U.S. Cl. ..................................................... 360/75
(58) Field of Search ........................ 360/78, 60, 78.08, 360/78.12, 77.02, 101, 294.4, 71, 75; 73/514.34; 29/25.35

(56) References Cited

U.S. PATENT DOCUMENTS

| | | | |
|---|---|---|---|
| 4,636,893 A * | 1/1987 | McClure ..................... 360/101 |
| 5,235,472 A * | 8/1993 | Smith .......................... 360/60 |
| 5,382,887 A * | 1/1995 | Guzik et al. ................ 318/652 |
| 5,390,949 A * | 2/1995 | Naganathan et al. ..... 280/5.515 |
| 5,539,270 A * | 7/1996 | Kaji et al. ................... 310/329 |
| 5,719,720 A * | 2/1998 | Lee .............................. 360/71 |
| 5,856,895 A | 1/1999 | Schaenzer et al. |
| 5,991,114 A | 11/1999 | Huang et al. |
| 6,079,088 A | 6/2000 | Schaenzer et al. |
| 6,098,460 A * | 8/2000 | Otsuchi et al. .......... 73/514.34 |
| 6,166,874 A | 12/2000 | Kim |
| 6,327,120 B1 | 12/2001 | Koganezawa et al. |
| 6,329,740 B1 * | 12/2001 | Hirota et al. ............... 310/328 |
| 6,351,341 B1 * | 2/2002 | Lee et al. ..................... 360/75 |
| 6,493,172 B1 * | 12/2002 | Morris et al. ............ 360/77.02 |
| 6,501,625 B1 | 12/2002 | Boismier et al. |
| 6,532,138 B1 * | 3/2003 | Koganezawa ............ 360/294.4 |
| 6,542,326 B1 * | 4/2003 | Ell et al. .................. 360/78.05 |
| 6,587,313 B2 * | 7/2003 | Kurihara et al. ......... 360/294.4 |
| 6,604,431 B1 * | 8/2003 | Soga et al. .................... 73/777 |
| 6,615,465 B2 * | 9/2003 | Otsuchi et al. ............. 29/25.35 |
| 6,621,653 B1 * | 9/2003 | Schirle ..................... 360/78.12 |
| 6,629,462 B2 * | 10/2003 | Otsuchi et al. .......... 73/514.34 |
| 6,667,844 B1 * | 12/2003 | Yao et al. ..................... 360/75 |
| 6,680,810 B2 * | 1/2004 | Shiraishi et al. ............. 360/75 |
| 6,721,136 B2 * | 4/2004 | Kurihara et al. ......... 360/294.4 |
| 6,724,560 B2 * | 4/2004 | Koganezawa et al. ... 360/77.02 |
| 6,724,563 B2 * | 4/2004 | Kobayashi et al. ...... 360/78.05 |
| 6,741,012 B2 * | 5/2004 | Koganezawa et al. ...... 310/328 |
| 2001/0038515 A1 | 11/2001 | Koganezawa et al. |
| 2003/0074783 A1 | 4/2003 | Boismier et al. |

FOREIGN PATENT DOCUMENTS

DE 198 16 909 A1 11/1998

(Continued)

*Primary Examiner*—David Hudspeth
*Assistant Examiner*—Fred F. Tzeng
(74) *Attorney, Agent, or Firm*—Arent Fox PLLC (57) ABSTRACT

A magnetic head supporting mechanism includes a fixing member, a piezoelectric element supported by the fixing member, and a head supporting member provided on the piezoelectric element, a magnetic head being supported by the head supporting member. An acceleration sensor is formed by the head supporting member and the piezoelectric element so as to be incorporated into the mechanism.

20 Claims, 10 Drawing Sheets

FOREIGN PATENT DOCUMENTS

| | | |
|---|---|---|
| EP | 0 895 225 A1 | 2/1999 |
| JP | 4-330679 | 11/1992 |
| JP | 7-253441 | 10/1995 |
| JP | 11-31368 | 2/1999 |
| JP | 2001-023323 | 1/2001 |
| JP | 2001-210032 | 8/2001 |

* cited by examiner

APPLIED ACCELERATED VELOCITY

MAGNETIC HEAD SUPPORTING AND POSITIONING CONTROL MECHANISM

BACKGROUND OF THE INVENTION

1. Field of the Invention

The present invention generally relates to a positioning control using a piezoelectric element, and more particularly, to a technique of precisely positioning a magnetic head using an accelerated velocity sensed by a piezoelectric element.

2. Description of the Related Art

Control of precisely positioning a magnetic head mounted on an arm is disclosed in, for example, Japanese Unexamined Patent Publication No. 11-31368. An actuator for a magnetic disk described in the above publication is made up of a fixing member, two piezoelectric element mounted thereon, a hinge provided on the piezoelectric elements, and a head supporting member having an end portion on which a magnetic head is mounted. Stress developed by applying voltages to the two piezoelectric elements is utilized to accurately position the magnetic heads through the hinge structure. The hinge structure is used to boost displacement of the magnetic head.

However, the above-mentioned conventional art uses the hinge structure, which needs a large number of components and structural complexity.

SUMMARY OF THE INVENTION

It is therefore an object of the present invention to provide a magnetic head supporting mechanism and a magnetic head positioning control mechanism in which the above disadvantage is eliminated.

A more specific object of the present invention is to provide a magnetic head supporting mechanism and a magnetic head positioning control mechanism, which mechanisms employ a unique structure that is capable of precisely positioning a magnetic head using a piezoelectric element and is composed of a smaller number of components.

The above objects of the present invention are achieved by a magnetic head supporting mechanism comprising: a fixing member; a piezoelectric element supported by the fixing member; and a head supporting member provided on the piezoelectric element, a magnetic head being supported by the head supporting member, an acceleration sensor being formed by the head supporting member and the piezoelectric element. An accelerated velocity can be sensed by the built-in acceleration sensor, so that the magnetic head can be accurately positioned. The piezoelectric element used is not directed to displacing the magnetic head but to sensing the accelerated velocity. Therefore, the magnetic head supporting mechanism does not need a hinge or the like and can thus be formed of a smaller number of parts.

The above objects of the present invention are also achieved by a magnetic head positioning control mechanism comprising: a magnetic head supporting mechanism including a fixing member, a piezoelectric element formed thereon, and a magnetic head supporting member that is provided on the piezoelectric element and supports a magnetic head; and a control system that corrects a positioning signal of the magnetic head by an output signal of the piezoelectric element, an acceleration sensor being formed by the head supporting member and the piezoelectric element.

The above objects of the present invention are also achieved by a magnetic head positioning control mechanism comprising: at least one magnetic disk; and a magnetic head supporting mechanism, the magnetic head supporting mechanism including a fixing member, a piezoelectric element formed thereon, and a magnetic head supporting member that is provided on the piezoelectric element and supports a magnetic head, an acceleration sensor being formed by the head supporting member and the piezoelectric element.

The above objects of the present invention are also achieved by a magnetic head positioning control mechanism comprising: at least one magnetic disk; a magnetic head supporting mechanism; and a control system, the magnetic head supporting mechanism including a fixing member, a piezoelectric element formed thereon, and a magnetic head supporting member that is provided on the piezoelectric element and supports a magnetic head, an acceleration sensor being formed by the head supporting member and the piezoelectric element.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS (Principles of the Invention)

First, a description will be given of the principles of the present invention with reference to FIGS. 1, 2A and 2B.

Figure 1:
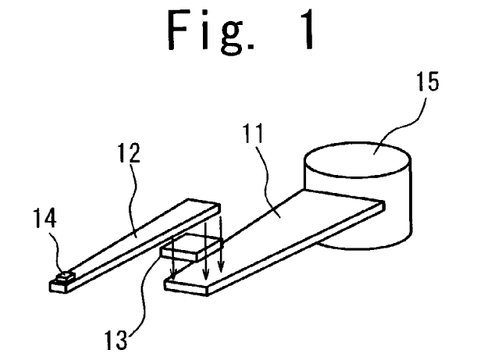
FIG. 1 is a perspective view illustrating the principles of a magnetic head supporting mechanism according to the present invention.

FIG. 1 is a perspective view that schematically illustrates a magnetic head supporting mechanism, which includes a fixing member 11, a head supporting member 12, and a piezoelectric element 13. The fixing member 11 may be called carriage, and the head supporting member 12 may be called suspension. An assembly that includes the fixing member 11 and the head supporting member 12 may be called arm, carriage, carriage arm or actuator.

The piezoelectric member 13 is attached to a free end portion of the fixing member 11. The piezoelectric element 13 acts as a piezoelectric vibrator. An end of the head supporting member 12 is attached on the piezoelectric element 13. A magnetic head 14 is attached to the other end of the head supporting member 12. The fixing member 11 is attached to a shaft 15. Although not illustrated for the sake of simplicity, the shaft 15 is driven and pivoted by driving means such as a voice coil motor, so that the head 14 can be moved and positioned at a target on a disk (not shown).

Figure 2A:
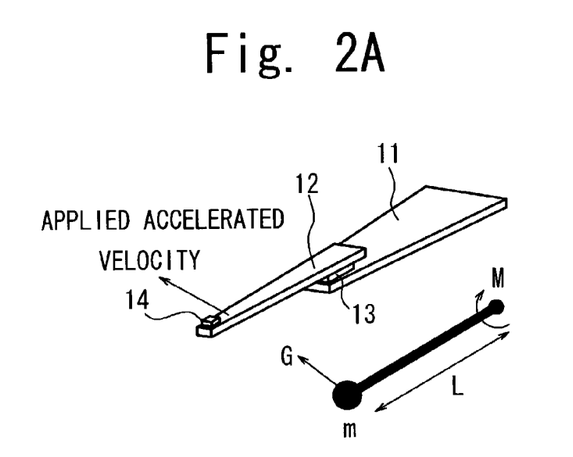
FIGS. 2A and 2B illustrate the principles of sensing an accelerated velocity.

As shown in FIG. 2A, when an accelerated velocity G is exerted onto the center of gravity of the head supporting member 12, the magnetic head supporting member 12 is rotationally moved about the point of action on the piezoelectric element 13. Rotational momentum M that occurs about the point of action can be represented as M=m*G*L where m is the mass of the head supporting member 12 and the magnetic head 14, and L denotes the distance between the center of gravity and the point of action. Stress that depends on the rotational moment M is developed in the piezoelectric element 13, and results in a charge by which an accelerated velocity G can be sensed. As described above, the acceleration sensor includes the head supporting member 12 and the piezoelectric element 13.

Figure 2B:
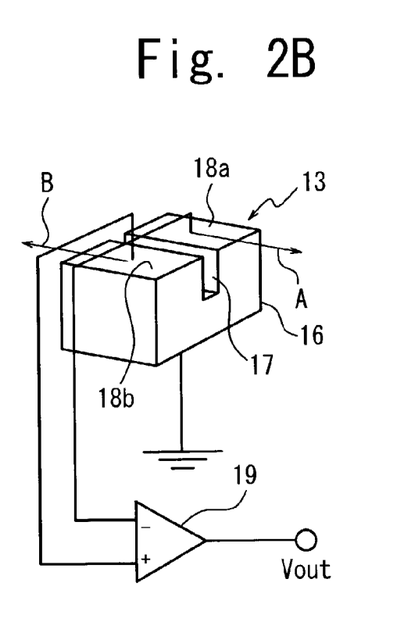

In order to efficiently sense an accelerated velocity G, the piezoelectric element 13 is structured as shown in FIG. 2B. The piezoelectric element 13 has a main body 16 of a piezoelectric single crystal, which may be lithium niobate (LiNbO$_3$) or lithium tantalite (LiTaO$_2$). Piezoelectric ceramic such as lead zirconate titanate (PZT) may be used to form the main body 16 of the piezoelectric element 13. The main body 16 may be a single-piece plate of piezoelectric ceramic. A groove 17 is formed on one surface of the main body 16, and defines two rectangular protrusions or bank portions 18a and 18b that run parallel to each other. The piezoelectric element 13 (main body 16) is polarized so as to be parallel to the groove 17 in order to effectively and efficiently sense the accelerated velocity. Detection electrodes are respectively provided on the bank portions 18a and 18b, and a ground electrode is formed on the surface of the main body 16 opposite to the surface on which the bank portions 18a and 18b are formed. The electrodes may be formed by silver baking or nickel/chromium-base gold plating. An output voltage Vout of a differential amplifier 19 is the output signal of the acceleration sensor. The dimensions of the main body 16 and the depth of the groove 17 may be selected taking into consideration the size and weight of the head supporting member 12, the distance between the head supporting member 12 and the piezoelectric element 13, and the desired sensor sensitivity.

The piezoelectric element 13 thus structured is located in the free end portion of the fixing member 11, and is attached so that the groove 17 of the piezoelectric element 17 is orthogonal to the imaginary straight line connecting the rotational center of the shift 15 and the magnetic head 14, in other words, to the longitudinal direction of the fixing member 11 or the head supporting member 12. The piezoelectric element 13 is located in the root portion of the head supporting member 12. The piezoelectric element 13 is attached so that the bottom surface thereof faces the fixing member 11, and the bank portions 18a and 18b face the head supporting member 12. Alternatively, the piezoelectric element 13 may be attached so that the bottom surface thereof faces the head supporting member 12 and the bank portions 18a and 18b face the fixing member 11.

When an accelerated velocity G is applied to the magnetic head 14 and the head supporting member 12, the piezoelectric element 13 is deformed in opposing directions A and B shown in FIG. 2B. In other words, sliding vibrations are developed in the directions A and B. The sliding vibrations result in charges of different polarities or signs on the bank portions 18a and 18b. These charges are respectively applied to the non-inverting and inverting input terminals of the differential amplifiers 19. The amplifier 19 amplifies and produces the resultant sense signal Vout. Since the charges of different polarities are amplified by the differential amplifier 19, the sense signal Vout is a high-output, low-noise signal. The sense signal Vout is proportional to the rotational moment M, thus representing the accelerated velocity G. In the above-mentioned manner, the accelerated velocity G exerted onto the magnetic head 14 can be sensed accurately.

As described above, the present invention has the novel magnetic head supporting mechanism that includes the fixing member 11, the piezoelectric element 13 supported by the fixing member 11, and the head supporting member 12 that is provided on the piezoelectric element 13 and supports the magnetic head 14, wherein the head supporting member 12 and the piezoelectric element 13 form the acceleration sensor. According to the present invention, the piezoelectric element 13 is used as one of the structural elements that make the acceleration sensor incorporated into the magnetic head supporting mechanism. This can avoid the use of the hinge that is used, in the conventional art, to effectively transmit the displacement of the piezoelectric element to the magnetic head as disclosed in the aforementioned publication. The hinge may degrade the stiffness of the head supporting member 12 and may cause longitudinal movement, so that only rotational moment cannot be accurately sensed.

Further, in order to use the piezoelectric element 13 as one of the structural components for the acceleration sensor, the polarizing direction of the piezoelectric element 13 is selected so as to be orthogonal to the longitudinal direction of the head supporting member 12. This differs from the piezoelectric element used in the conventional art in which the piezoelectric element is longitudinally polarized for moving the magnetic head due to displacement of the piezoelectric element. Further, the magnetic head supporting mechanism of the invention can be assembled by a smaller number of parts because it does not employ the hinge. It is to be noted that the term "orthogonal" does not need an accurate angle of 90 degrees but tolerates a certain angular range in which the accelerated velocity can be detected under the desired condition. Though the orthogonal condition may result in the highest sensitivity, an angle that slightly deviates from 90 degrees may provide a desired sensitivity or accuracy.

The piezoelectric element 13 has the groove 17 that runs in the direction orthogonal to the central axis of the head supporting member 12 along the longitudinal direction thereof, and is polarized in the direction in which the groove 17 extends. Alternatively, the piezoelectric element 13 may have another structure. For example, a piezoelectric element may be used which has a plurality of grooves that run in the direction orthogonal to the longitudinal direction of the head supporting member 12. Also, yet another piezoelectric element may be used which is composed of two block-like piezoelectric elements arranged side by side in the direction orthogonal to the longitudinal direction of the head supporting member 12. The block-like piezoelectric elements are polarized in the direction orthogonal to the longitudinal direction of the head supporting member 12. Further, the magnetic head supporting mechanism is not limited to the electrode arrangement shown in FIG. 2B, but may employ various electrode arrangements, some of which will be described later.

(First Embodiment)

A description will now be given of a first embodiment of the present invention, which has an electrode leading arrangement described below.

Figures 3A, 3B:
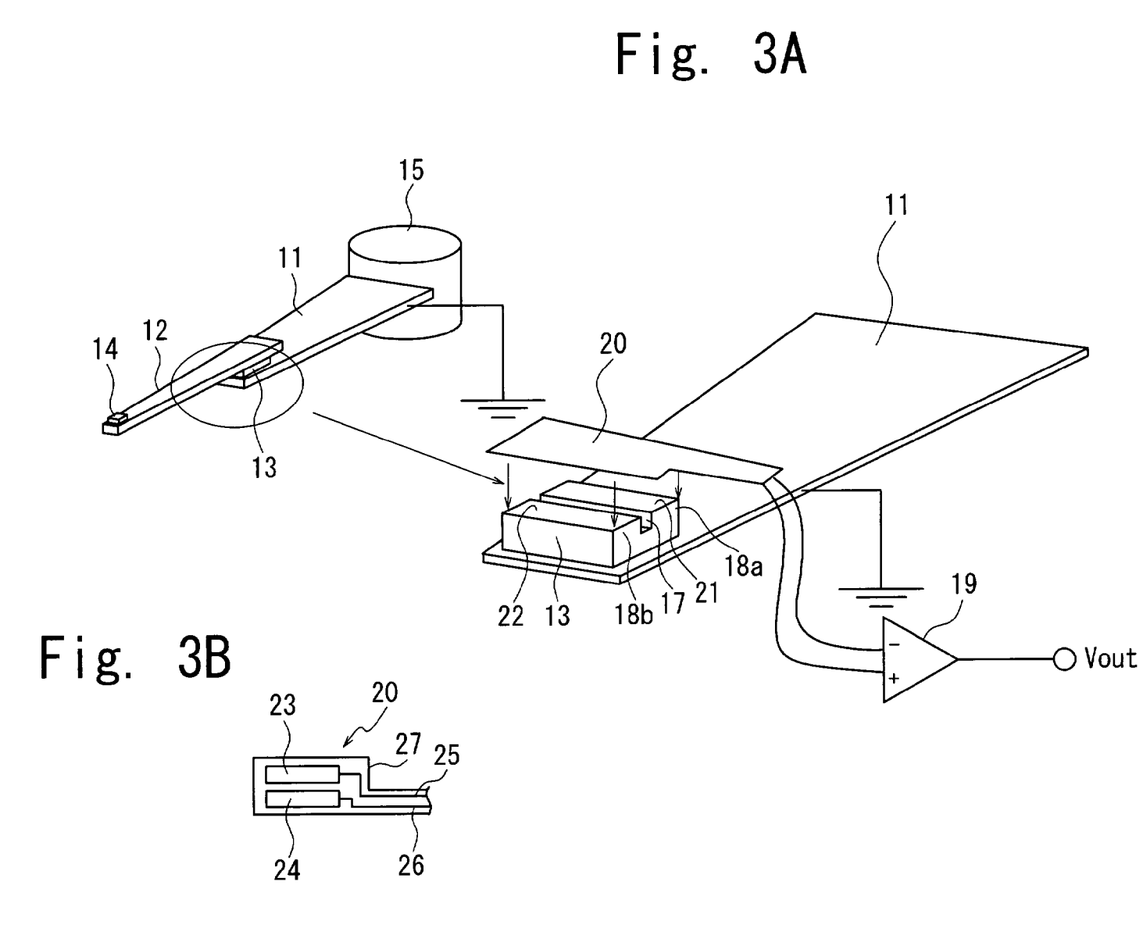
FIGS. 3A and 3B illustrate a first embodiment of the present invention.

FIGS. 3A and 3B illustrate the first embodiment of the present invention, in which parts that are the same as those shown in the previously described figures are given the same reference numerals. As shown in FIG. 3A, a flexible wiring board or film 20 is used to pick up the sense signal Vout from the piezoelectric element 13 arranged so that the bank portions 18a and 18b face the head supporting member 12. FIG. 3B is a bottom view of the flexible printed wiring board 20, which may be a flexible printed-circuit board. The flexible wiring board 20 has electrode patterns 23 and 24 formed on a flexible insulating layer 27. The electrode patterns 23 and 24 are positioned on electrodes 21 and 22 respectively provided on the bank portions 18a and 18b of the piezoelectric element 13, and are electrically connected thereto by means of an electrically conductive adhesive agent or an anisotropic conductive adhesive agent. Lead lines 25 and 26 are respectively connected to the electrode patterns 23 and 24, which are connected to the differential amplifier 19. The piezoelectric element 13 has a bottom surface on which a ground electrode is provided. The ground electrode is fixed to the fixing member 11 made of, for example, a metal or an electrically conductive substance. The fixing may be made by electrically conductive or anisotropic conductive epoxy resin. There is no need to provide, on the fixing member 11, a ground line extending from the ground electrode of the piezoelectric element 13.

Figure 4:
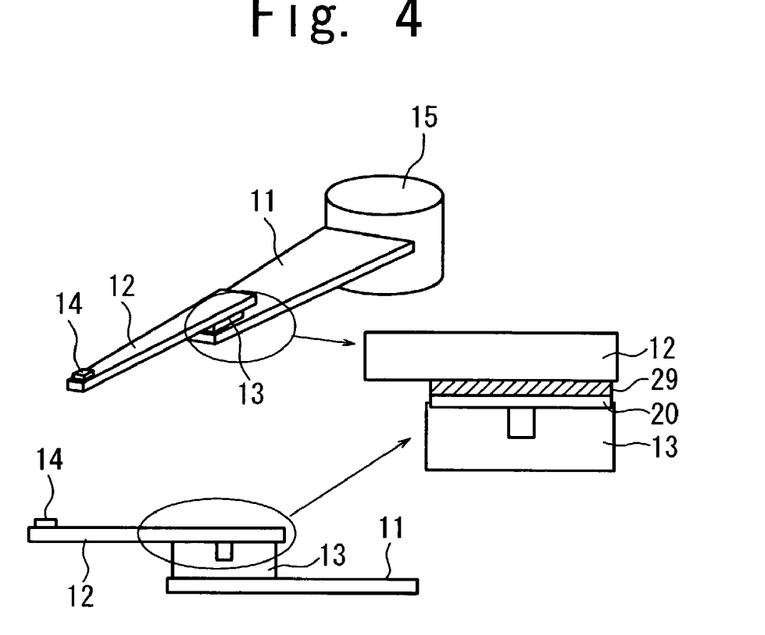
FIG. 4 illustrates a variation of the first embodiment of the present invention.

As shown in FIG. 4, an insulating layer 29 is provided on the flexible wiring board 20, and the head supporting member 12 is provided on the insulating layer 29, these layers being fixed by an adhesive agent such as epoxy resin. This arrangement electrically isolates the head supporting member 11 made of metal from the flexible wiring board 20.

(Second Embodiment)

A second embodiment of the present invention has a unique size and arrangement of the piezoelectric element 13 on the head supporting member 12.

Generally, the sensor with the piezoelectric element (piezoelectric vibrator) senses charges developed by stress. The developing method may be classified into a charge sense method that directly senses the charges developed and a voltage sense method that senses the voltage dependent on the charges developed. The maximum sensitivity of the charge sense method depends on the material constant. Adjusting the size of the piezoelectric element to thus alter the degree of stress developed therein can change the maximum voltage generated by the voltage sense method. More specifically, the smaller the area of the piezoelectric element (the surface areas of the bank portions 18a and 18b in FIG. 2), the larger the generated voltage if there is no change in any portion other than the piezoelectric element, that is, if there is no change in the total mass m of the magnetic head 14 and the head supporting member 12 and the length L between the center of gravity and the point of action. Additionally, the length L increases as the piezoelectric element 13 on the head supporting member 12 becomes close to the root portion of the head supporting member 12.

Figure 5A:
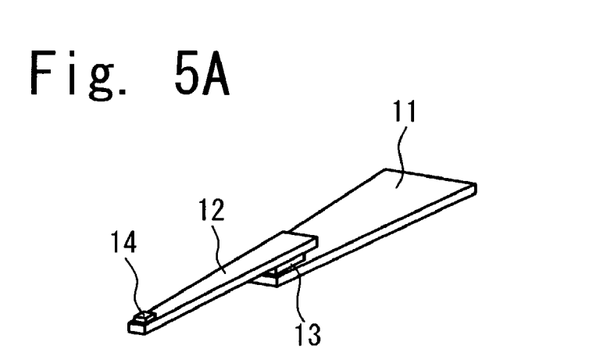
FIGS. 5A and 5B illustrate a second embodiment of the present invention.
Figure 5B:
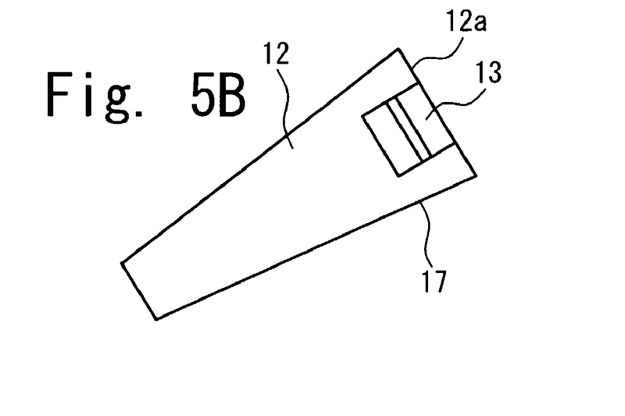

Taking into consideration the above viewpoints, the piezoelectric element 13 is constructed and arranged, as shown in FIG. 5. The edge of the piezoelectric element 13 is aligned with an edge 12a of the head supporting member 12, so that the side surface of the piezoelectric element 13 is flush with or continuous to the rear surface of the head supporting member 12. The acceleration sensor thus configured is capable of generating an increased maximum voltage generated or sensitivity.

(Third Embodiment)

A third embodiment of the present invention has a unique attachment of the piezoelectric element 13 on the head supporting member 12.

As in the case of the first and second embodiments of the present invention, the third embodiment thereof has an arrangement in which the groove 17 of the piezoelectric element 13 is orthogonal to the longitudinal direction of the head supporting member 12 (which is indicated by R in FIG. 6), and the polarizing direction coincides with the direction in which the groove 17 runs. The piezoelectric element 13 is directly attached to an insulating area 32 formed on the head supporting member 12. In the arrangement shown in FIG. 6, the bottom surface of the piezoelectric element 13 faces the insulating area 32. Alternatively, the above arrangement may be modified so that the bank portions 18a and 18b face the insulating area 32. The piezoelectric element 13 is fixed to the head supporting member 12 by an adhesive agent. The insulating area 32 may, for example, be a film of an insulating substance such as polyimide, the film being provided on the head supporting member 12. The insulating area 32 is provided in the vicinity of the root portion of the head supporting member 12, and has an area that is slightly greater than the size of the piezoelectric element 13. The insulating area 32 electrically insulates the piezoelectric element 13 from the head supporting member 12. Further, the insulating area 32 makes it possible to lead signal lines from the detection electrodes of the piezoelectric element 13 without the flexible wiring board 20. In case where the flexible wiring board 20 is interposed between the head supporting member 12 and the piezoelectric element 13, propagation loss of energy may be caused. In contrast, the third embodiment of the present invention detects vibration energy without propagation loss due to the arrangement of the piezoelectric element 13 directly attached to the head supporting member 12 via the insulating area 32. Thus, the sensitivity of the acceleration sensor can further be improved.

Figure 6:
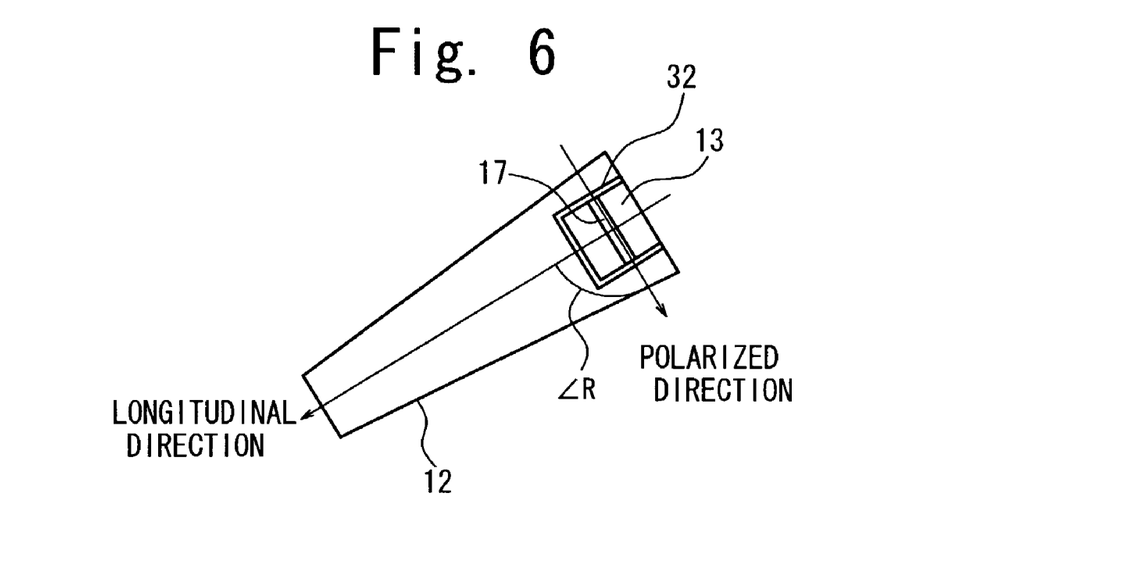
FIG. 6 illustrates a third embodiment of the present invention.
Figure 7A:
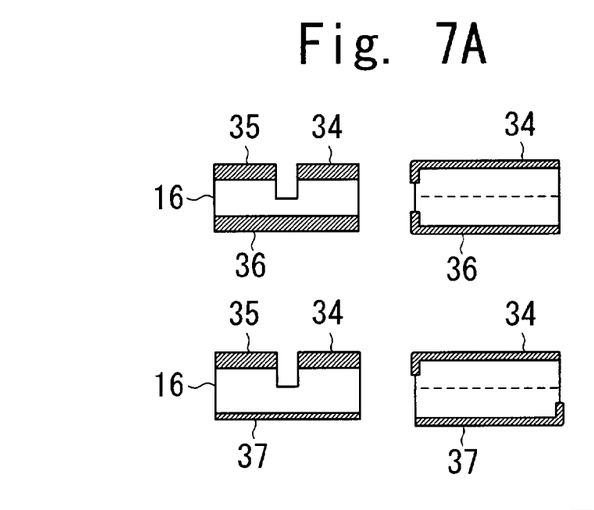
FIGS. 7A, 7B and 7C illustrate electrode arrangements of the third embodiment of the present invention.

FIGS. 7A through 7C show various electrode arrangements suitable for the structure shown in FIG. 6. Two figures on the upper side of FIG. 7A show a first arrangement of detection electrodes, wherein the figure on the right side is a front view of the piezoelectric element, and the figure on the left side is a left side view thereof. Detection electrodes 34 and 35 are respectively provided on the top surfaces of the two bank portions of the piezoelectric element main body 16 and extends over upper portions of the left-side surfaces of the bank portions in the polarized direction. A ground electrode 36 is provided on the whole bottom surface of the main body 16 and extend over the lower portion of the left-side surface thereof. The detection electrodes 34 and 35 and the ground electrode 36 have the respective extending portions on the left side of the piezoelectric element main body 16. The detection electrodes 34 and 35 touch the insulating area 32 (FIG. 6) on the head supporting member 12. The ground electrode 36 is provided directly on the fixing member 11. Signal lines such as wire lines for making external connections may be connected to the extending electrode portions by soldering or another connecting means.

There are also two figures illustrated on the lower side of FIG. 7A, in which a variation of the electrode arrangement shown in the upper side of FIG. 7A is illustrated. A ground electrode extends over the lower portion of the right side surface of the main body 16. This results in an arrangement in which the two side surfaces opposite to each other in the polarized direction are integrally provided with the extending portions of the electrodes. This allows accessing the electrodes from the both sides of the main body 16, and enhances the degree of freedom in arranging signal lines for making external connections.

Figure 7B:
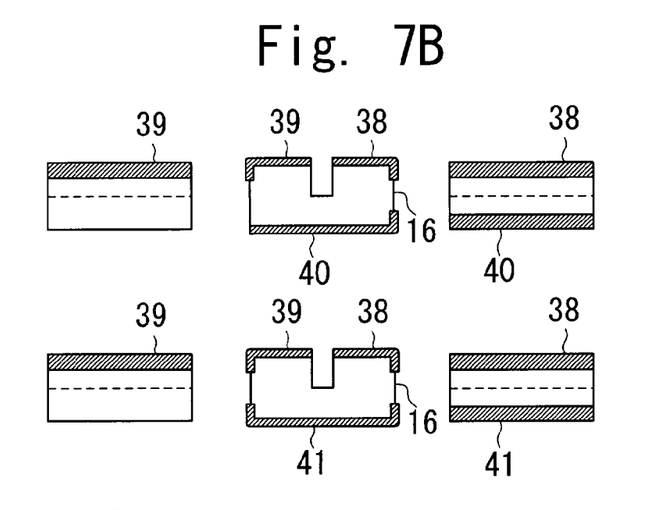

The upper side of FIG. 7B shows another electrode arrangement, and the lower side thereof shows a variation thereof. Detection electrodes 38 and 39 are formed on the top surfaces of the two bank portions of the piezoelectric element main body 16, and extend over upper portions of opposing side surfaces thereof that extend in the direction parallel to the polarized direction in which the groove 17 runs. A ground electrode 40 is provided on the whole bottom surface of the main body 16 and extends over a lower portion of the right side surface thereof in the polarized direction.

Figure 7C:
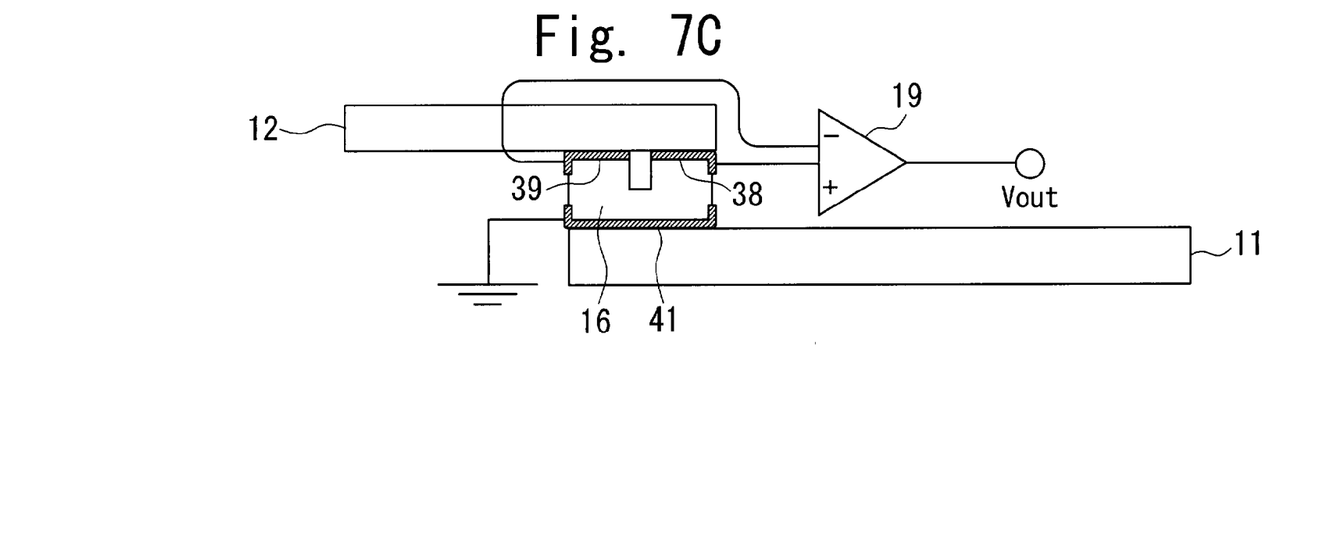

The variation shown in the lower side of FIG. 7B shows a ground electrode 41, which extends over lower portions of the opposing side surfaces facing via the groove 17. This variation is positioned as shown in FIG. 7C. The detection electrodes 38 and 38 contact the insulating area 32 (FIG. 6) of the head supporting member 12. Signal lines such as wires connected to the differential amplifier 19 are connected to the extending electrode portions by soldering or another connecting means. The ground electrode 41 is connected directly to the fixing member 11, and a ground line is connected to one of the extending portions of the ground electrode 41.

As described above, the third embodiment of the present invention does not employ any flexible wiring board, this making it possible to effectively and efficiently transmit vibration energy from the head supporting member 12 to the piezoelectric element 13 and to achieve easy access for making external connections.

(Fourth Embodiment)

A fourth embodiment of the present invention has a unique electrode arrangement described below.

Figure 8:
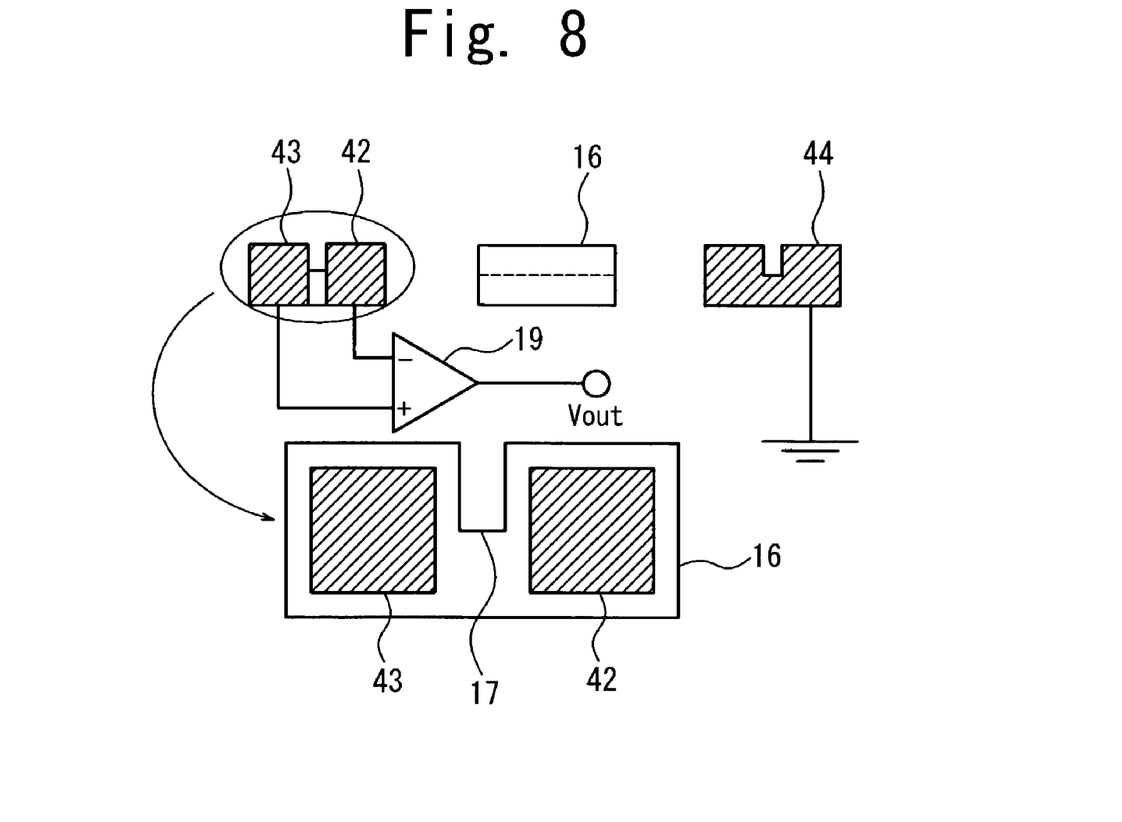
FIG. 8 illustrates a fourth embodiment of the present invention.

FIG. 8 illustrates the present embodiment, which has the two detection electrodes 42 and 43 provided on one of two side surfaces opposite to each other in the polarized direction, and the ground electrode 44 provided on the other side surface. The detection electrodes 42 and 43 are spaced apart from each other via the groove 17. The detection electrodes 42 and 43 are provided on the respective side surfaces of the two bank portions. The ground electrode 44 is formed on the whole side surface of the piezoelectric element main body 16. Signal lines such as wires extending from the differential amplifier 19 are connected to the detection electrodes 42 and 43 by soldering or the like, and the ground electrode 44 is grounded as shown in FIG. 8. The arrangement shown in FIG. 8 in which the detection electrodes 42 and 43 are arranged side by side in the direction orthogonal to the polarized direction enables highly efficient sensing of acceleration.

(Fifth Embodiment)

Figure 9:
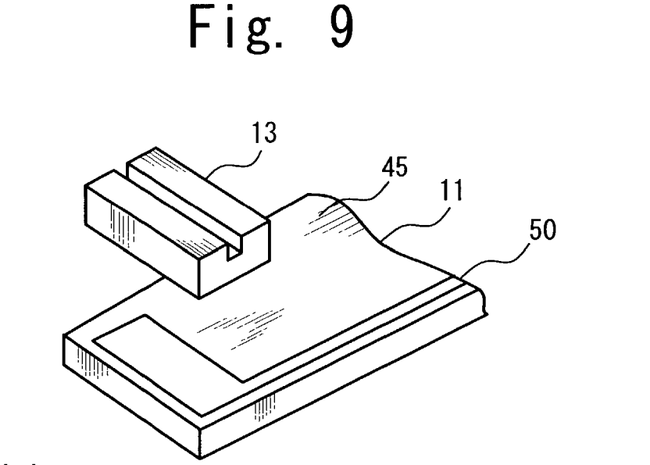
FIG. 9 illustrates a fifth embodiment of the present invention.

FIG. 9 is an exploded perspective view of a fifth embodiment of the present invention. An insulating film 45 made of, for example, polyimide, is formed on the fixing member 11. A wiring pattern 50, which has an electrode portion contacting the ground electrode formed on the bottom surface of the piezoelectric element 13, is formed on the insulating film 45. The piezoelectric element 13 is grounded via the wiring pattern 50. The above arrangement is effective to an arrangement in which the fixing member 11 is not grounded so that the fixing member 11 has a floating potential.

Figure 10A:
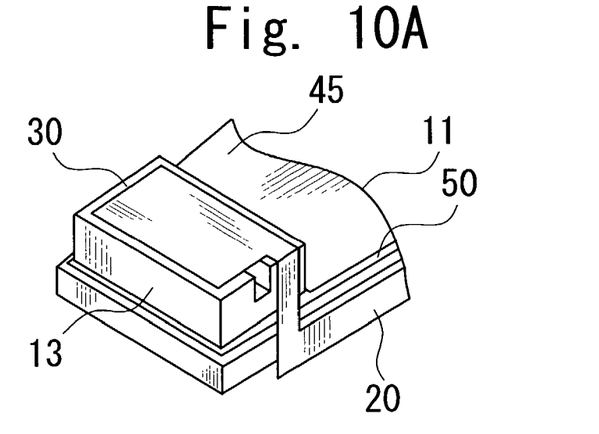
FIGS. 10A, 10B and 10C respectively illustrate electrode arrangements of the fifth embodiment of the present invention.
Figure 10B:
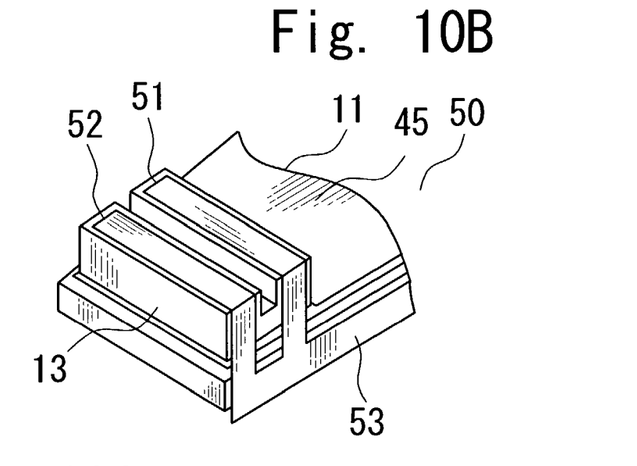
Figure 10C:
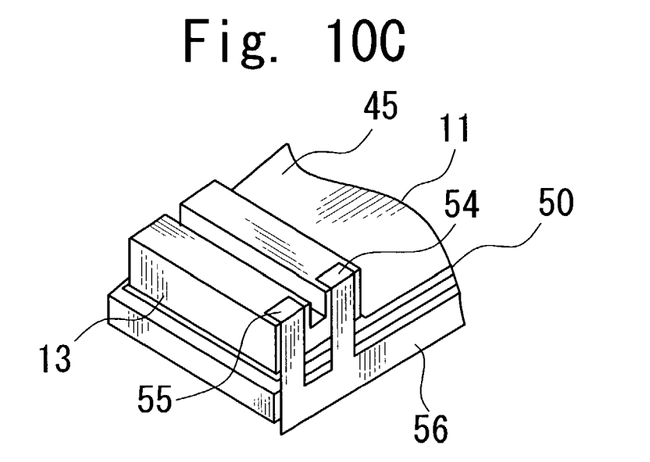

In this case, the leading of the signal lines from the detection electrodes may be achieved as shown in FIGS. 10A through 10C, in which flexible wiring boards are used. The flexible wiring board 20 shown in FIG. 10A has an electrode pattern as shown in FIG. 3C, the pattern being formed on an insulating member of a lead portion 30 of the flexible wiring board 20. The lead portion 30 is provided so as to bridge the two bank portions. The electrode pattern contacts the detection electrodes of the piezoelectric element 13. A flexible wiring board 53 shown in FIG. 10B has branch portions 51 and 52, which correspond to the whole top surfaces of the respective bank portions of the piezoelectric element 13. Electrode patterns are formed on the branch portions 51 and 52 and are in contact with the detection electrodes of the piezoelectric element 13. A flexible wiring board 56 shown in FIG. 10C has branch portions 54 and 55, which correspond to parts of the top surface portions of the respective bank portions. The branch portions 54 and 55 contact only the end portions of the detection electrodes of the piezoelectric element 13.

The arrangements shown in FIGS. 10A through 10C may be varied so that the wiring pattern 50 is replaced by the flexible wiring boards in order to lead the ground electrode of the piezoelectric element 13. In this variation, the flexible wiring boards have a branch portion that contacts the ground electrode of the piezoelectric element 13.

In another variation, the bottom surface of the piezoelectric element 13 may directly contact the fixing member 11 formed of an electrically conductive substance such as metal, as in the case of the aforementioned first embodiment of the present invention.

Figure 11:
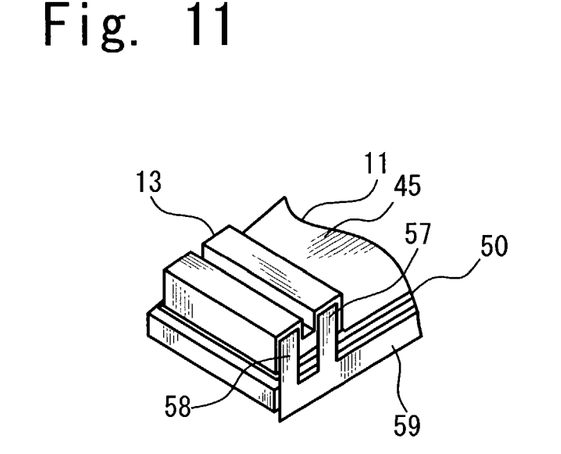
FIG. 11 illustrates a variation of the fifth embodiment of the present invention.

In yet another variation, the detection electrodes and/or the ground electrodes shown in FIGS. 7A through 7C may be employed. Further, the detection electrodes 42 and 43 shown in FIG. 8 may be used. In this case, a flexible wiring board 59 that has branch portions 57 and 58 shown in FIG. 11 may be used. The branch portions 57 and 58 have respective electrode patterns, which are attached to the detection electrodes 42 and 43 by an electrically conductive adhesive agent. In this case, the bottom surface of the piezoelectric element 13 may directly contact the electrically conductive fixing member 11.

(Sixth Embodiment)

Figure 12:
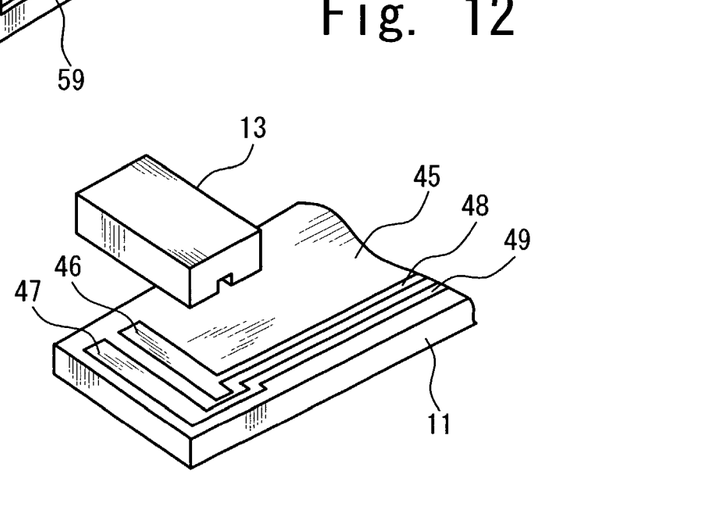
FIG. 12 illustrates a sixth embodiment of the present invention.

FIG. 12 shows an exploded perspective view of a sixth embodiment of the present invention. The piezoelectric element 13 is provided so that the bank portions thereof face the fixing member 11. Electrode patterns 46 and 47, which correspond to the detection electrodes on the bank portions, are formed on the insulating layer 45 formed on the fixing member 11. The detection electrodes of the piezoelectric element 13 are fixed to the electrode patterns 46 and 47 by an electrically conductive adhesive agent. Lead electrode patterns 48 and 49 extend from the electrode patterns 46 and 47, respectively.

The sixth embodiment of the present invention may be modified variously by using the structures of the first through fifth embodiments. For example, the electrode patterns 46 and 47 may be replaced by the flexible wiring boards shown in FIGS. 10A through 10C. The detection electrodes of the piezoelectric element 13 are electrically connected to the lead portion 30 of the flexible wiring board 20 shown in FIG. 10A, the branch portions 51 and 52 shown in FIG. 10B, or the branch portions 54 and 55 shown in FIG. 10C.

Figure 13A:
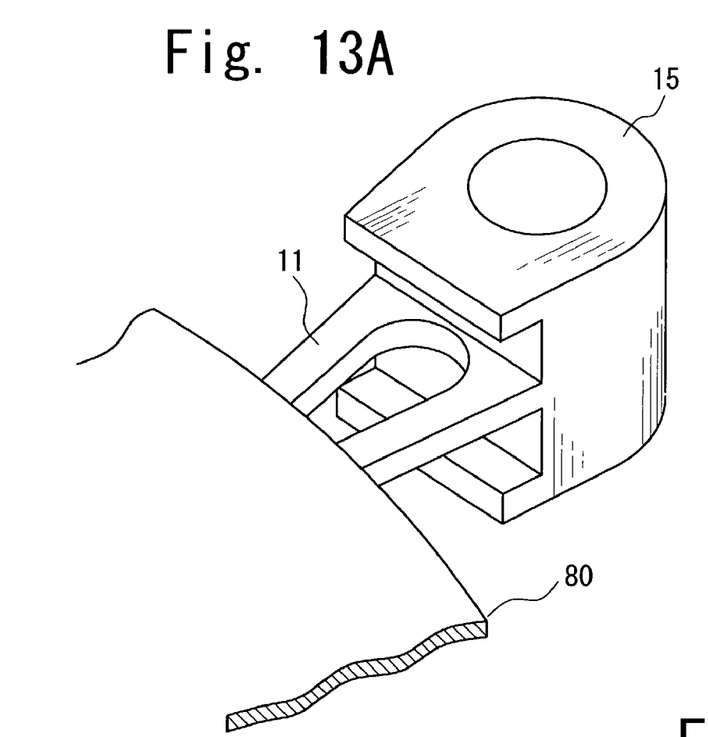
FIGS. 13A and 13B illustrate a relationship between the magnetic head supporting mechanism and a magnetic disk.
Figure 13B:
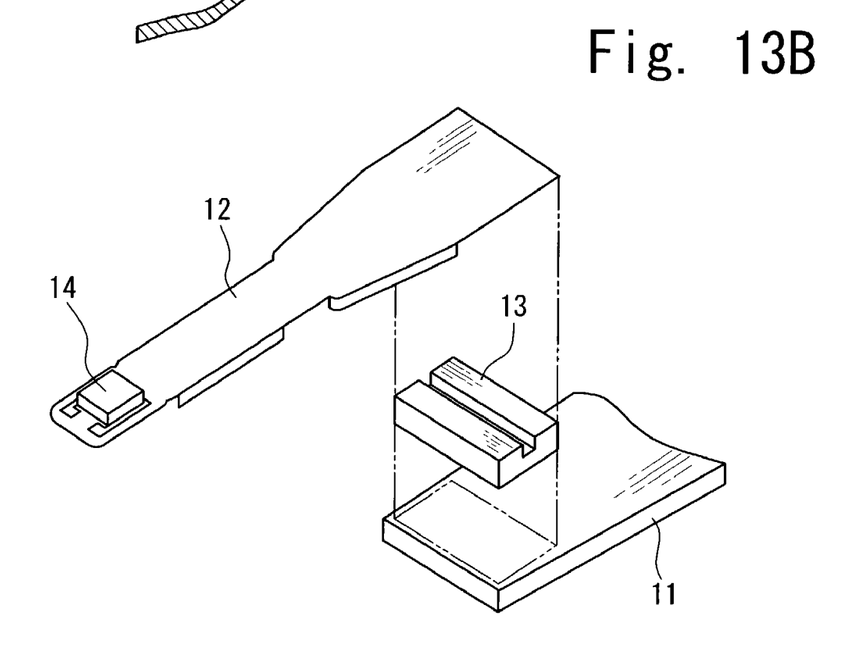

As is shown in FIGS. 13A and 13B, the magnetic head supporting mechanism of the present invention is positioned with respect to a magnetic disk 80 in a magnetic disk drive. FIGS. 13A and 13B show an arrangement in which the fixing member 11 extends below the magnetic disk 80. The magnetic head 14 (hidden by the disk 80) on the had supporting member 12 fixed to the piezoelectric element 13 supported by the fixing member 11 is located above the recording surface formed on the back surface of the disk 80. A shaft 15, to which the fixing member 11 is fixed, is rotated by a voice coil motor (not shown for the sake of simplicity), so that the magnetic head 14 slides above the magnetic disk 80. A similar mechanism may be provided above the magnetic disk 80 that has the upper recording surface from or into which data can be read or written. A plurality of magnetic disks including the magnetic disk 80 may be stacked, and a pair of magnetic heads is provided to each of the disks. Of course, the present invention includes a magnetic disk drive such that magnetic heads are provided to only the respective upper or lower recording surfaces arranged in stacked formation.

It is to be noted that FIG. 13B includes all the embodiments in which the back surface of the piezoelectric element 13 faces the fixing member and electrodes and lead electrodes are omitted for the sake of simplicity. Of course, the piezoelectric element 13 may be turned upside down and applied to the magnetic head supporting mechanism shown in FIG. 13A.

(Seventh Embodiment)

A description will now be given of a seventh embodiment of the present invention directed to a magnetic head positioning control mechanism that includes a control system capable of finely adjusting the position of the magnetic head 14 on the basis of the detection or sense signals of the acceleration sensor of the above-mentioned magnetic head supporting mechanism.

Figure 14:
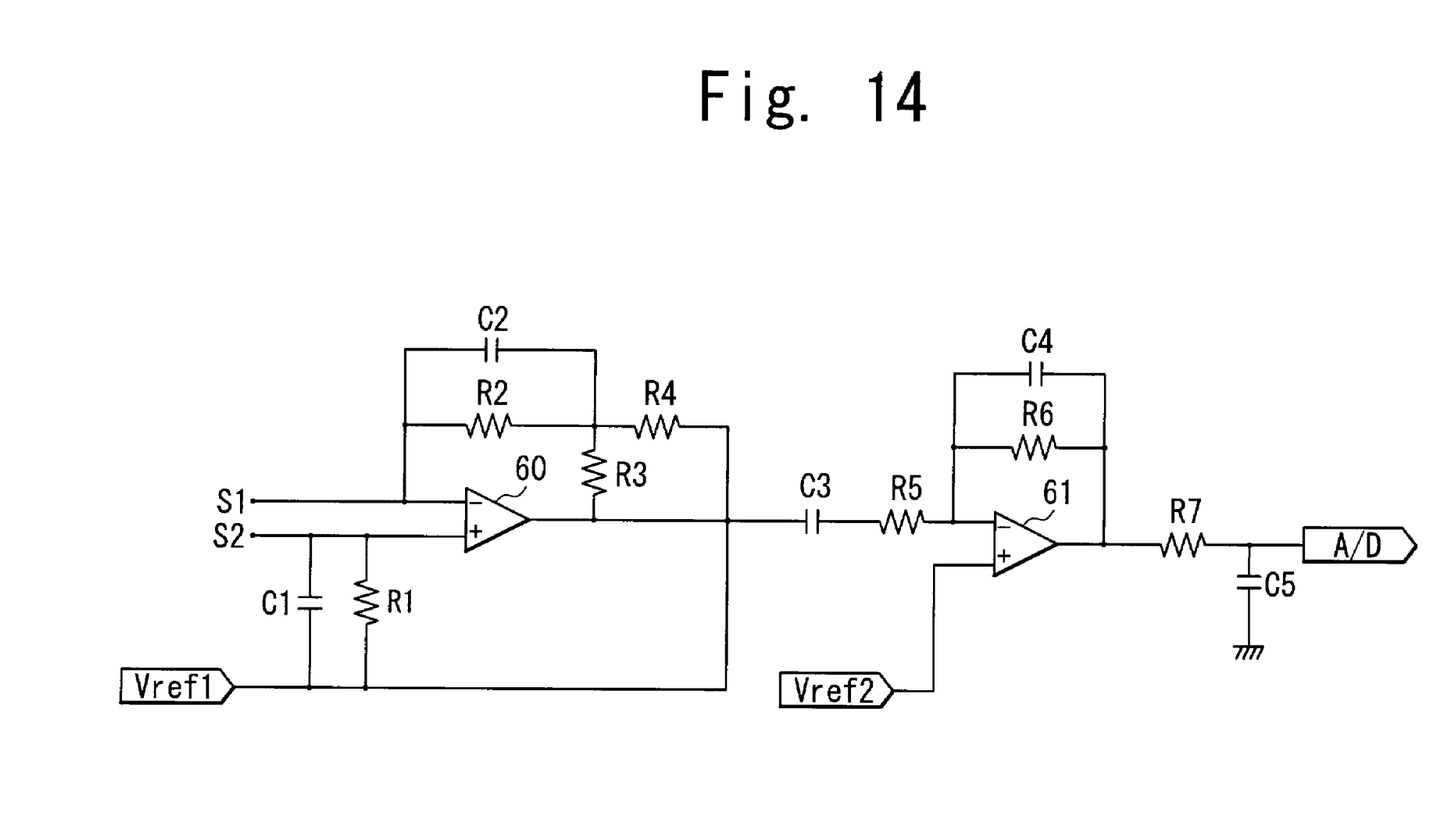
FIG. 14 is a circuit diagram of a differential amplifier according to a seventh embodiment of the present invention.

FIG. 14 is a circuit diagram of a circuit configuration of the aforementioned differential amplifier 19. As is shown in this figure, the differential amplifier 19 receives signals S1 and S2 picked up by the two detection electrodes of the piezoelectric element 13. The differential amplifier 19 includes two operational amplifiers 60 and 61, resistors R1 through R7, and capacitors C1 through C5. The differential amplifier 60 with a reference voltage Vref1 applied thereto differentially amplifies the signals S1 and S2, and applies a resultant signal to the operational amplifier 61. The analog output signal of the differential amplifier 61 passes through a high-pass filter and is converted into a digital signal, which is then applied to a feedback control system described below.

Figure 15:
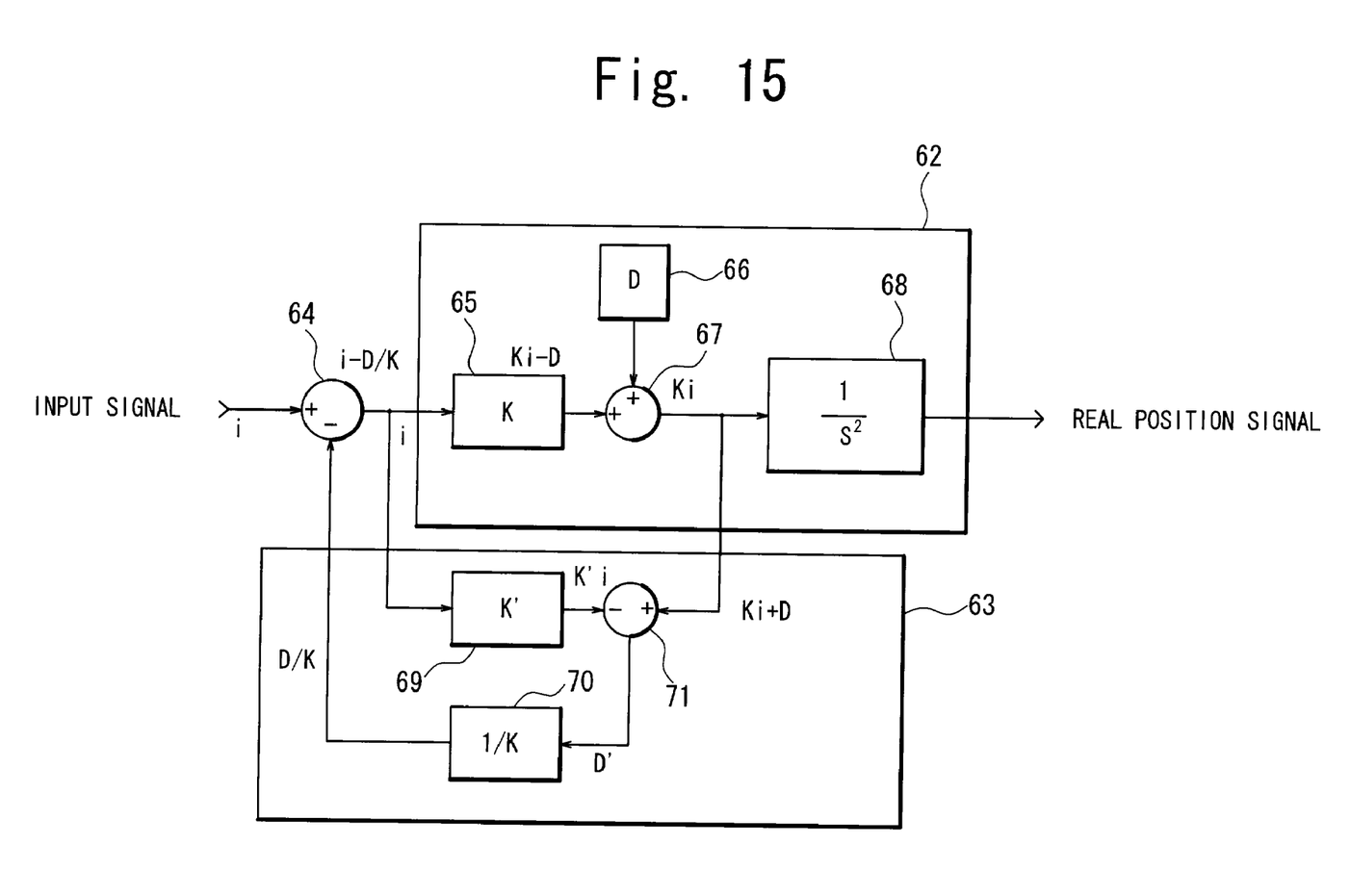
FIG. 15 is a block diagram of a feedback system according to the seventh embodiment of the present invention.

FIG. 15 is a block diagram illustrating the feedback control system using the detection signal of the acceleration sensor. The feedback control system is composed of a modeled controlled object 62, a disturbance observer 63, and an adder 64. An input signal indicative of the position of the magnetic head is corrected by the feedback control system, and the resultant signal is then applied to the voice coil motor as a real positioning signal. The feedback control system may be configured by, for example, software.

The controlled object 62 includes a current-to-torque converter 65, an adder 67 and a twice integrators 68. The detection signal Vout of the acceleration sensor is applied to the adder 67 as disturbance D. The disturbance observer 63 includes a current/to-torque converter 69, a torque-to-current converter 70 and an adder 71. The disturbance observer 63 outputs a correction signal D/K (K is coefficients represented by matrix) to the adder 64.

The adder 64 receives an input signal I (current) and the output D/K of the disturbance observer 63, and outputs i-D/K to the controlled object 62. The current-to-torque converter 65 Ki-D obtained by multiplying i-D/K by K to the adder 67. Then, the adder 67 receives Ki-D and disturbance (accelerated velocity) D, and resultant torque Ki to the twice integrator 68 and the disturbance observer 63. The output signal of the twice integrator 68 is the real positioning signal obtained by correcting input signal i by the accelerated velocity sensed. The current-to-torque converter 69 of the disturbance observer 63 outputs K'i obtained by multiplying current i by coefficient K' (=K) to the adder 71. The adder 71 subtracts K'i from Ki output by the adder 67, and outputs the resultant signal D' (torque estimated from disturbance: D'=D) to the torque-to-current converter 70. The torque-to-current converter 70 multiplies D' by 1/K, and outputs the resultant D/K to the adder 64.

The present embodiment employs the disturbance observer 63 that uses the accelerated velocity sensed as disturbance, this making it possible to accurately position the magnetic head without influence of disturbance.

According to the present invention, there are provided a magnetic head supporting mechanism and a magnetic head positioning control mechanism, which mechanisms employ a unique structure that is capable of precisely positioning a magnetic head using a piezoelectric element and is composed of a smaller number of components.

Although a few preferred embodiments of the present invention have been shorn and described, it would be appreciated by those skilled in the art that changes may be made in these embodiments without departing from the principles and spirit of the invention, the scope of which is defined in the claims and their equivalents.

What is claimed is:

1. A magnetic head supporting mechanism comprising:
   a fixing member;
   a piezoelectric element supported by the fixing member; and
   a head supporting member provided on the piezoelectric element, a magnetic head being supported by the head supporting member,
   an acceleration sensor for sensing acceleration in a direction parallel to a surface of a magnetic disk associated with the magnetic head supporting mechanism, the acceleration sensor being formed by the head supporting member and the piezoelectric element, wherein the piezoelectric element has a groove that runs in a direction orthogonal to a center axis of the head supporting member along a longitudinal direction thereof.

2. A magnetic head supporting mechanism comprising:
   a fixing member;
   a piezoelectric element supported by the fixing member; and
   a head supporting member provided on the piezoelectric element, a magnetic head being supported by the head supporting member, an acceleration sensor being formed by the head supporting member and the piezoelectric element, wherein the piezoelectric element is polarized in a direction orthogonal to a center axis of the head supporting member along a longitudinal direction thereof.

3. A magnetic head supporting mechanism comprising:
a fixing member;
a piezoelectric element supported by the fixing member; and
a head supporting member provided on the piezoelectric element, a magnetic head being supported by the head supporting member,
an acceleration sensor being formed by the head supporting member and the piezoelectric element, wherein the piezoelectric element has a groove that runs in a direction orthogonal to a center axis of the head supporting member along a longitudinal direction thereof.

4. A magnetic head supporting mechanism comprising:
a fixing member;
a piezoelectric element supported by the fixing member; and
a head supporting member provided on the piezoelectric element, a magnetic head being supported by the head supporting member,
an acceleration sensor being formed by the head supporting member and the piezoelectric element, wherein the piezoelectric element has a groove that runs in a direction orthogonal to a center axis of the head supporting member along a longitudinal direction thereof, and is polarized in the direction in which the groove runs.

5. A magnetic head supporting mechanism comprising:
a fixing member;
a piezoelectric element supported by the fixing member; and
a head supporting member provided on the piezoelectric element, a magnetic head being supported by the head supporting member,
an acceleration sensor being formed by the head supporting member and the piezoelectric element, wherein the piezoelectric element has a groove that runs in a direction orthogonal to a center axis of the head supporting member along a longitudinal direction thereof, the groove facing the head supporting member.

6. A magnetic head supporting mechanism comprising:
a fixing member;
a piezoelectric element supported by the fixing member; and
a head supporting member provided on the piezoelectric element, a magnetic head being supported by the head supporting member,
an acceleration sensor being formed by the head supporting member and the piezoelectric element, wherein the piezoelectric element has a groove that runs in a direction orthogonal to a center axis of the head supporting member along a longitudinal direction thereof, the groove facing the fixing member.

7. A magnetic head supporting mechanism comprising:
a fixing member;
a piezoelectric element supported by the fixing member; and
a head supporting member provided on the piezoelectric element, a magnetic head being supported by the head supporting member,
an acceleration sensor being formed by the head supporting member and the piezoelectric element, further comprising a flexible wiring board electrically connected to electrodes formed on the piezoelectric element, wherein the piezoelectric element has a groove that runs in a direction orthogonal to a center axis of the head supporting member along a longitudinal direction thereof.

8. A magnetic head supporting mechanism comprising:
a fixing member;
a piezoelectric element supported by the fixing member; and
a head supporting member provided on the piezoelectric element, a magnetic head being supported by the head supporting member,
an acceleration sensor being formed by the head supporting member and the piezoelectric element, further comprising an insulating layer provided between the piezoelectric element and the head supporting member, wherein the piezoelectric element has a groove that runs in a direction orthogonal to a center axis of the head supporting member along a longitudinal direction thereof.

9. A magnetic head supporting mechanism comprising:
a fixing member;
a piezoelectric element supported by the fixing member; and
a head supporting member provided on the piezoelectric element, a magnetic head being supported by the head supporting member,
an acceleration sensor being formed by the head supporting member and the piezoelectric element, wherein the piezoelectric element is positioned so that one end thereof coincides with a root portion of the head supporting member, and has a width narrower than that of the head supporting member, wherein the piezoelectric element has a groove that runs in a direction orthogonal to a center axis of the head supporting member along a longitudinal direction thereof.

10. A magnetic head supporting mechanism comprising:
a fixing member;
a piezoelectric element supported by the fixing member; and
a head supporting member provided on the piezoelectric element, a magnetic head being supported by the head supporting member,
an acceleration sensor being formed by the head supporting member and the piezoelectric element, wherein the piezoelectric element has two bank portions for picking up signals resulting from sensing an accelerated velocity, and wherein the piezoelectric element also has a groove that runs in a direction orthogonal to a center axis of the head supporting member along a longitudinal direction thereof.

11. A magnetic head supporting mechanism comprising:
a fixing member;
a piezoelectric element supported by the fixing member; and
a head supporting member provided on the piezoelectric element, a magnetic head being supported by the head supporting member,
an acceleration sensor being formed by the head supporting member and the piezoelectric element, wherein the piezoelectric element has detection electrodes, each of which is integrally provided on two surfaces of the piezoelectric element, and wherein the piezoelectric element also has a groove that runs in a direction orthogonal to a center axis of the head supporting member along a longitudinal direction thereof.

12. A magnetic head supporting mechanism comprising:
a fixing member;
a piezoelectric element supported by the fixing member; and
a head supporting member provided on the piezoelectric element, a magnetic head being supported by the head supporting member,
an acceleration sensor being formed by the head supporting member and the piezoelectric element, wherein the head supporting member has an insulating area in a root portion thereof, and an electrode on the piezoelectric element contacts the insulating area, wherein the piezoelectric element has a groove that runs in a direction orthogonal to a center axis of the head supporting member along a longitudinal direction thereof.

13. A magnetic head supporting mechanism comprising:
a fixing member;
a piezoelectric element supported by the fixing member; and
a head supporting member provided on the piezoelectric element, a magnetic head being supported by the head supporting member,
an acceleration sensor being formed by the head supporting member and the piezoelectric element, the piezoelectric element comprises detection electrodes on one of side surfaces of the piezoelectric element, and wherein the piezoelectric element also has a groove that runs in a direction orthogonal to a center axis of the head supporting member along a longitudinal direction thereof.

14. A magnetic head supporting mechanism comprising:
a fixing member;
a piezoelectric element supported by the fixing member; and
a head supporting member provided on the piezoelectric element, a magnetic head being supported by the head supporting member,
an acceleration sensor being formed by the head supporting member and the piezoelectric element, wherein the piezoelectric element comprises detection electrodes on a first side surface of the piezoelectric element, and a ground electrode on a second side surface opposite to the first side surface in a direction in which the piezoelectric element is polarized, and wherein the piezoelectric element also has a groove that runs in a direction orthogonal to a center axis of the head supporting member along a longitudinal direction thereof.

15. A magnetic head supporting mechanism comprising:
a fixing member;
a piezoelectric element supported by the fixing member; and
a head supporting member provided on the piezoelectric element, a magnetic head being supported by the head supporting member,
an acceleration sensor being formed by the head supporting member and the piezoelectric element, wherein the fixing member has a lead electrode pattern formed on a surface thereof, the lead electrode pattern being connected to an electrode of the piezoelectric element.

16. A magnetic head supporting mechanism comprising:
a fixing member;
a piezoelectric element supported by the fixing member; and
a head supporting member provided on the piezoelectric element, a magnetic head being supported by the head supporting member,
an acceleration sensor being formed by the head supporting member and the piezoelectric element, wherein:
the fixing member has a lead electrode pattern formed on a surface thereof;
the magnetic head supporting mechanism further comprises a flexible wiring board;
the piezoelectric element has electrodes formed thereon; and
the electrodes are electrically connected to the lead electrode pattern and the flexible wiring board.

17. A magnetic head positioning control mechanism comprising:
a magnetic head supporting mechanism including a fixing member, a piezoelectric element formed thereon, and a magnetic head supporting member that is provided on the piezoelectric element and supports a magnetic head; and
a control system that corrects a positioning signal of the magnetic head by an output signal of the piezoelectric element,
an acceleration sensor being formed by the head supporting member and the piezoelectric element, wherein the piezoelectric element has a groove that runs in a direction orthogonal to a center axis of the head supporting member along a longitudinal direction thereof.

18. The magnetic head positioning control mechanism as claimed in claim 17, wherein the control system comprises a disturbance observer in which the output signal of the piezoelectric element is used as disturbance.

19. A magnetic head positioning control mechanism comprising:
at least one magnetic disk; and
a magnetic head supporting mechanism, the magnetic head supporting mechanism including a fixing member, a piezoelectric element formed thereon, and a magnetic head supporting member that is provided on the piezoelectric element and supports a magnetic head,
an acceleration sensor for sensing acceleration in a direction parallel to a surface of a magnetic disk associated with the magnetic head supporting mechanism, the acceleration sensor being formed by the head supporting member and the piezoelectric element, wherein the piezoelectric element has a groove that runs in a direction orthogonal to a center axis of the head supporting member along a longitudinal direction thereof.

20. A magnetic head positioning control mechanism comprising:
at least one magnetic disk;
a magnetic head supporting mechanism; and
a control system, the magnetic head supporting mechanism including a fixing member, a piezoelectric element formed thereon, and a magnetic head supporting member that is provided on the piezoelectric element and supports a magnetic head,
an acceleration sensor being formed by the head supporting member and the piezoelectric element, the control system correcting a positioning signal of the magnetic head by an output signal of the piezoelectric element, wherein the piezoelectric element has a groove that runs in a direction orthogonal to a center axis of the head supporting member along a longitudinal direction thereof.

* * * * *